Feb. 17, 1970     G. D. HAVILLE ET AL     3,496,370
BILL VALIDATION DEVICE WITH TRANSMISSION AND COLOR TESTS
Filed May 16, 1966     2 Sheets-Sheet 1
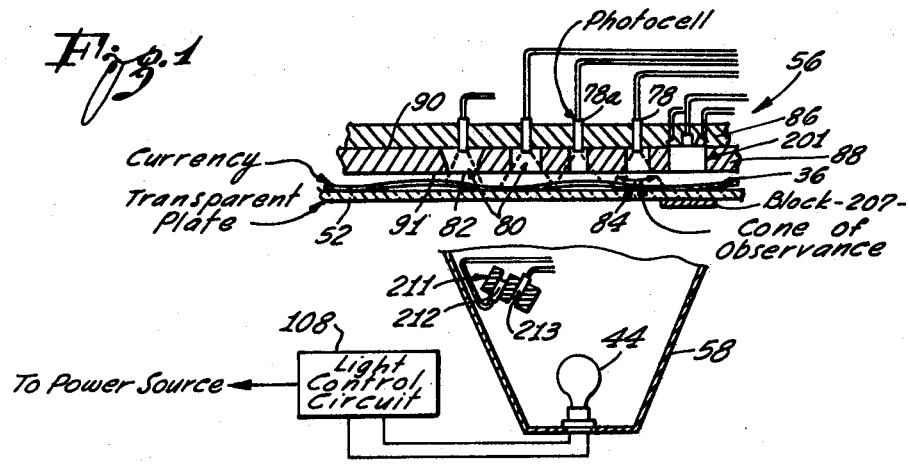
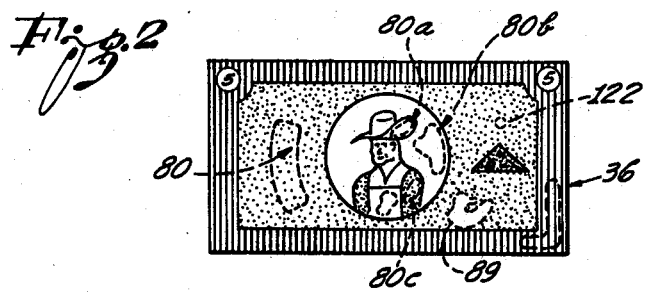
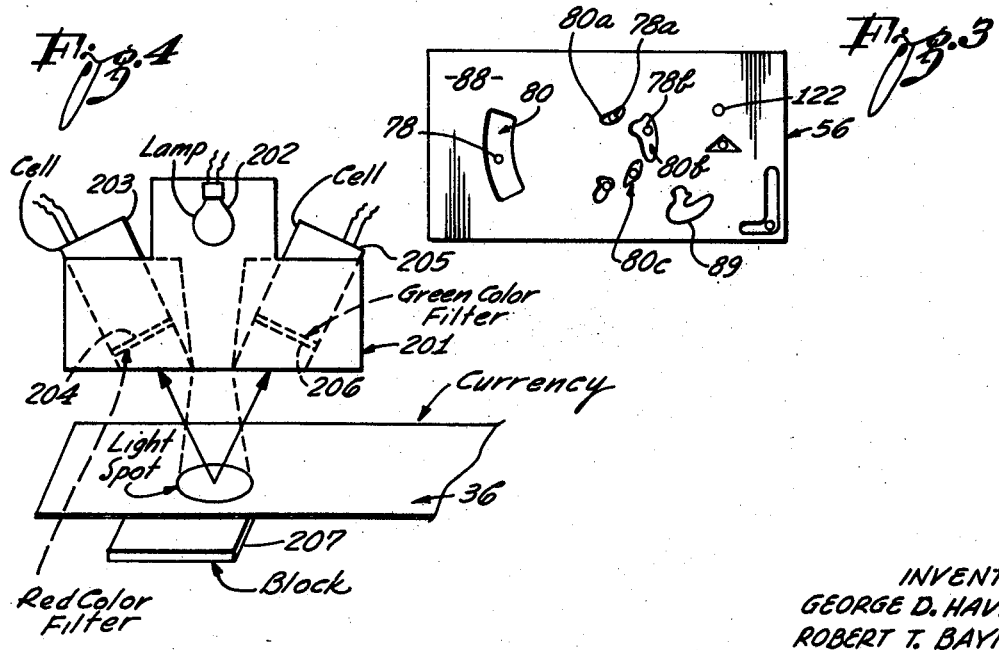
INVENTORS
GEORGE D. HAVILLE
ROBERT T. BAYNE
AGENT

INVENTORS:
GEORGE D. HAVILLE
ROBERT T. BAYNE

AGENT

United States Patent Office 3,496,370
Patented Feb. 17, 1970

3,496,370
BILL VALIDATION DEVICE WITH TRANSMISSION AND COLOR TESTS
George D. Haville and Robert T. Bayne, Santa Barbara, Calif., assignors to Advance Data Systems Corporation, Beverly Hills, Calif., a corporation of New York
Filed May 16, 1966, Ser. No. 550,481
Int. Cl. G01n *21/32*
U.S. Cl. 250—219
9 Claims

ABSTRACT OF THE DISCLOSURE

A currency verifier wherein, in addition to measuring light transmitted through a plurality of shaped areas, the color balance and reflectance of the bill are checked. Color balance is checked by illuminating a selected spot on the bill, the reflected light is measured by a pair of photocells, each through a different colored filter. Reflectance is measured by comparing the light reflected from a standard reflectance surface with the light reflected from a selected spot on the bill. Both the spot and standard reflector are illuminated by a common lamp. Comparing circuits are provided to pass the bill if the color balance and reflectance fall within predetermined limits.

---

This invention relates to currency validators employed in equpment which controls apparatus for makng change or dispensing merchandise in exchange for paper currency. More particularly, this invention relates to a currency validator which receives and validates the authenticity of currency of a preselected denomination by observing the light transmission through preselected shaped areas, by measuring reflectance from a selected area and by checking the color of a selected area on the currency being checked.

In bill validation systems of the prior art, as for example that disclosed by application, Ser. No. 452,065, Bill Acceptance and Detection System, filed Apr. 30, 1965, by George D. Haville, bill validation was limited to measuring the light transmitted through selected shaped areas of the bill. The transmitted illumination was detected by photocells, compared and summed, then converted to a unipolarity acceptance or rejection signal. While such a system provides a high degree of security, there was no check as to the proper color of a bill or of the reflectance thereof. Certain techniques may be employed to produce copies of genuine bills which will pass the system of the above disclosed co-pending application as valid. In addition to the measurement of light transmited through selected shaped areas, the present invention employs a pair of photocells sensitive to different colors to determine the color balance of a selected area of the bill. By checking the color, simple black and white copies of a valid bill could not be made to pass through the machine as valid. In addition to the color check, the reflectance validating check serves to determine the amount of light reflected from the underside of the bill. This reflected light must fall within preset limits to enable the bill to be accepted as valid. The reflectance validation prevents copies of a bill on one side only, which may be properly colored, from being passed by the machine as valid. While the bill validating unit of the above-mentioned co-pending application provides a high degree of security, it has limitations which have been largely eliminated by the present invention. The additional equipment required to eliminate the limitations of the above-mentioned co-pending application are relatively simple and inexpensive, requiring only four additional light sensitive cells, a lamp and some minor additional circuitry.

It is, therefore, an object of this invention to provide a secure and reliable bill validation device.

Another object of this invention is to provide a bill validation device which will reliably validate bills of varying ages and conditions.

Another object of this invention is to provide validation of paper currency by detecting transmission through shaped areas, reflectance of a selected area, and detecting the color reflection characteristics of a selected area.

Another object of this invention is to provide a bill validation device having a summed unipolarity output signal suitable for operating a change making or vending machine.

These and other objects and advantages of the present invention will be better understood from the following description considered in connection with the accompanying drawings, wherein an illustrative embodiment of the invention is disclosed by way of example and in the accompanying specification.

In the drawings:
FIGURE 1 is an enlarged sectional view of the detection device incorporating the present invention;

FIGURE 2 illustrates a group of irregularly shaped apertures in an illustrative embodiment of a detection head, as they would appear with an illustrative bill overlying them;

FIGURE 3 illustrates the detection head of FIGURE 2 with the bill removed so as to expose the photocells embedded in the cavities;

Figure 5:
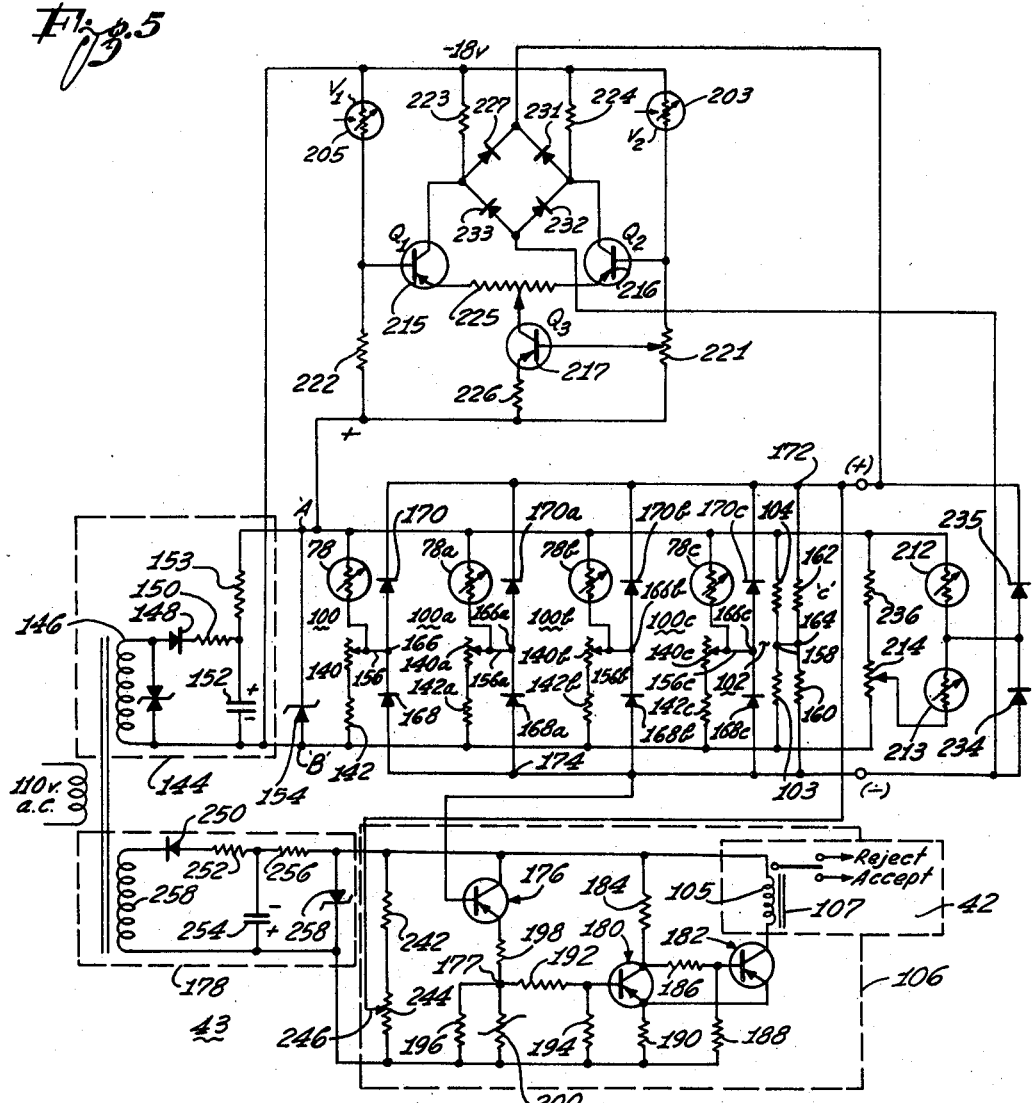
Figure 6:
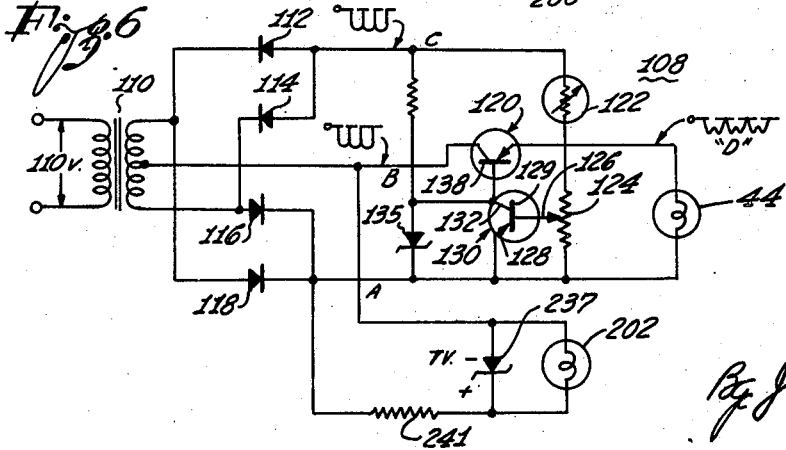

FGURE 4 illustrates the color detection device in the detection head of FIGURE 1 in detail;

FIGURE 5 is a schematic drawing of the validating circuitry including the color validating check and the reflectivity check of the present invention; and FIGURE 6 illustrates the illumination circuits of the present invention.

Referring now to the drawings, and particularly to FIGURE 1 thereof, a bill 36 which is to be validated is placed on a transparent plate in the vicinity of detection head 56, by means not part of the present invention, but disclosed in said co-pending application Ser. No. 452,065. The bill to be validated rests upon a transparent plate 52 in alignment with detection head 56. A light source 44 is supported below the plate 52 within a suitable reflecting enclosure 58 for directing light through plate 52. The light passing through plate 52 illuminates the bill 36, passing through the bill with an intensity pattern duplicating the printed pattern upon the bill being tested.

Detection head 56 comprises an array of photoelectric cells arranged to read selected portions of the light pattern emanating from the bill 36 so that the pattern may be electronically evaluated with respect to the proper pattern for an authentic bill of the selected denomination. As will be apaprent, different arrays may be used for bills of different denominaions, so that each individual unit is capable of being customized to receive and evaluate bills of any single selected denomination. The units may also be subsequently modified for use with bills of a different denomination.

Light sensitive cells 78 are arranged in the detection head 56, fabricated of light impervious material. Each cell 78 is contained in the bottom of a specially-shaped cavity or enclosure 80 in the lower face 91 of the detection head 56. Since during the validation process the face of the detection head 56 is immediately adjacent to the bill to be validated, the cells 78 are separated from the bill 36 to be validated by a distance equal to the depth of the cavity 80. Each light sensitive cell 78 measures the amount of illumination in the specially-shaped cavity 80 between the bill 36 and the cell 78. With the use of the shaped cavity 80, a cell 78 may respond to light transmitted through an area of the bill somewhat larger than the photocell diameter.

Since the cavity may be shaped in a variety of manners, the cell 78 may observe an area on a particular bill which is peculiar to that bill. Thus, the shaped cavities 80 and aperture 82 in the detection head 56 are patterned so as to be peculiar to a particular type of bill. These cavities or apertures 82 may be irregular, curved, rectangular or any desired shape that fits the pattern to be recognized. For example if it is assumed that the bill 36 to be validated has a picture of a man with the sleeve having a particular shading, as illustrated in FIGURES 2 and 3, the cavity 80C associated with a photocell 78C measuring that area would be shaped as is the sleeve and would measure the intensity of light not likely to be found in any other piece of printed material.

In addition to observing and validating the light transferance characteristic of particular shaped areas, it is desirable to validate the color of a bill. The paper currencies of many nations have peculiar and distinctive colors which are difficult to simulate. Exemplarily, there is the green of United States bills, the red of certain German bills, and the rust color of the British ten shilling note. The color validating head 201 is mounted in detection head 56 over the area that the color is to be checked. As illustrated more clearly in FIGURE 4, the color validation head includes an illuminating lamp 202, a first light sensitive cell 203 and its associated color filter 204, which may exemplarily be red, a second light sensitive cell 205 and its accompanying color filter 206, which may conveniently be green. Lamp 202 directs a spot of light onto the desired area of bill 36. The light reflected from the spot is received by cells 203 and 205 through red filter 204 and green filter 206 respectively. As will be readily apparent, a particular color reflected from the illuminated spot on the bill will give the desired ratio of output from cells 203 and 205. The desired ratio is set by the circuit illustrated in FIGURE 5. To prevent interference with the color validating arrangement by lamp 44, an opaque patch 207 is placed on translucent plate 52 directly below the position of the color validating check device 201, as is clearly illustrated in FIGURES 1 and 4.

As discussed hereinabove, the reflectance of the underside of the bill is measured, using the known reflectance from reflector 58 as a reference. As will be apparent, the total amount of light reflected from the underside of a valid bill will fall within certain designated limits, depending upon the denomination of the bill. A reflectance validity checking device 211 is mounted in reflector 58, as illustrated in FIGURE 1. First light sensitive cell 212 is directed upward to measure the amount of light reflected from the underside of bill 36. A second reference light sensitive cell 213 measures the light reflected from reflector 58 by lamp 44. The desired ratio of the two outputs is set by the circuit illustrated in FIGURE 5.

An illustrative embodiment of the validation circuitry is schematically illustrated in FIGURE 5. The circuit comprises a DC bridge in which each cadmium-sulphide photocell 78, 78a, 78b and 78c, responsive to the shaped areas, and its associated resistors 140, 140a, 140b, 140c and 142, 142a, 142b and 142c form a bridge branch 100, 100a, 100b, 100c, which is balanced against a fixed bridge branch 102. Fixed bridge branch 102 comprises two resistors 104 and 105 in series. All of the shaped area cell bridge branches 100, 100a, 100b and 100c are in parallel. Therefore, in accordance with bridge theory, well known to those skilled in the art, the decision signal output of the bridge will be dependent upon the sum of the error voltage signals appearing in the individual branches.

Each shaped area cell 78, and its associated balancing resistor 140 is adjusted so that when a valid bill is being tested a null is obtained and no error signal appears at the output 172, 174 of the detection system. Such a null indicates that each shaped area cell is measuring an illumination value in its associated cavity 80 which is proper for the bill being validated. If any of the shaped area cells are receiving more or less illumination than the value for which its associated branch 100 is adjusted, the voltage appearing across the associated cell will change accordingly and a positive or negative error voltage will be generated. Since all of the shaped area cell branches 100, 100a, 100b, and 100c are connected in parallel to the fixed branch 102 of the bridge, the decision signal output of the detection system will be the arithmetic sum of the error signals generated by the shaped area cells.

In addition, the reflectance validity test cells 212 and 213 are connected in a bridge circuit similar to that including the photocell branches 100. Thus, cell 212 is equivalent to cell 78 in the bridge circuit, and cell 213 in combination with potentiometer 214 is equivalent to potentiometer 140 and resistor 142. The color validity check circuit comprises red sensitive cell 203, green sensitive cell 205 and a differential transistor pair including transistors 215 and 216. In addition, a transistor 217 is provided to adjust circuit voltages in accordance with the absolute value of the illumination received by red sensitive cell 203.

As in the case of shaped area cells 100, and reflectance validitiy cells 212 and 213, the error signal output for the color validity check circuit can be either positive or negative. As will be further disclosed hereinbelow, additional circuitry is provided so that the actual accept or reject signal is independent of the polarity of the individual error signals.

A DC bridge circuit is employed to furnish a unidirectional summing signal to the input of the trigger circuit 106 regardless of whether the signals from the individual cells are positive or negative. The cells 78 employed in the illustrative embodiment are each connected in series with a potentiometer 140 and fixed resistors 142. Each of the cell branches 100 are in parallel with the others and with reference branch 102, composed of series resistors 104 and 105. All of the branches 100 and the reference branch 102 are connected across the DC voltage appearing at voltage buses A and B from half wave rectifier circuit 144, connected to the AC line through transformer winding 146. Diode 148 and the filter consisting of resistor 150 and capacitor 152 convert the output of the transformer to a half wave filtered DC output voltage appearing at buses A and B of FIGURE 5. A Zener diode 194 and resistor 153 are provided to regulate the output voltage, in a manner well known to those skilled in the art.

When a valid bill is being sensed by detection head 56, each adjustable potentiometer, 140, 140a, 140b, 140c should be adjusted so that no voltage may be measured between sliding contact 156, 156a, 156b, 156c and junction 158 of reference branch 102. In other words these bridge circuits are set up for a normal null condition. In addition potentiometer 214 is adjusted to provide a null output from the reflectance validity circuit.

The color validity circuit includes a zero adjust potentiometer 221 in series with red sensitive cell 203 and a fixed resistor 222 in series with green sensitive cell 205. The junction of green sensitive cell 205 and fixed resistor 222 is connected to the base electrode of transistor 215, similarly the junction between red sensitive cell 203 and potentiometer 221 is connected to the base electrode of transistor 216. The resistors 223 and 224, connected to the collector electrodes of transistors 215 and 216, respectively, are the load resistors for the differential amplifier circuit. The error voltage is developed by the difference in voltage across resistors 223 and 224. Transistors 215 and 216 receive a signal at their base electrodes from the voltage dividers comprised of green responsive cell 205 and resistor 222, and red responsive cell 203 and potentiometer 221, respectively. As the green responsive cell and the red responsive cell view the spot of light on the bill, the resistance of the cell varies in accordance with the amount of light passing through their respective color filters. Since the cells and their series resistors form voltage divider circuits, the voltages applied to the base electrodes of transistors 215 and 216 vary in accordance with the amount of illumination received by each cell. A balancing potentiometer 225 is provided to adjust the relative sensitivity of the circuit to green and red light.

In addition to the differential transistor circuit, an additional transistor 217 is included in the color validity check circuit. Transistor 217 receives a signal from a portion of potentiometer 221. Transistor 217 develops a voltage drop across resistor 226 connected to its emitter electrode. The collector electrode of transistor 217 is connected to color balancing potentiometer 225. The voltage drop across each portion of color balancing potentiometer 225 sets the emitter voltage for transistors 215 and 216. The current passed by transistor 217 and, therefore, the voltage drop across emitter resistor 226 is a function of the resistance of red sensitive cell 203. Transistor 217 is thereby enabled to adjust circuit voltages in accordance with the total amount of illumination and, in addition, in accordance with the absolute value of the illumination received by red sensitive cell 203.

The junction of the collector electrode of transistor 215 and collector resistor 223 and the collector electrode of transistor 216 and collector resistor 224 are connected to a full wave diode bridge, including diodes 227, 231, 232 and 233. An error signal at the junction of the collector electrode of transistor 215 and collector resistor 223 or an error signal at the junction of collector electrode of transistor 216 and collector resistor 224 can be either positive or negative, depending upon whether transistor 215 or transistor 216 is conducting the greater current. As is well known to those skilled in the art, a full wave diode bridge, such as that illustrated with the diodes connected with the polarity illustrated, always provides a positive output at the junction of diodes 227 and 231, and a negative output at the junction of diodes 232 and 233, regardless of whether the collector of transistor 215 is more or less positive than the collector of transistor 216. The junction of diodes 227 and 231 is connected to positive error bus 172 and the junction of diodes 232 and 233 is connected to negative error bus 174. The magnitude of the error voltage is determined by the color balance and by the absolute amount of light received by red sensitive cell 203. Transistors 215 and 216, forming the differential amplifier circuit, determine the color ratio between the two cells while the absolute magnitude is adjusted by potentiometer 221 in connection with red sensitive cell 203. Both checks must be in the correct ratio and of the correct magnitude before a true null can exist between the opposite sides of the diode bridge.

As will be apparent, unless apparatus is provided for converting the positive and negative error voltages furnished by the shaped area cells to unidirectional error signals as provided by the color validation circuit, cancellation will take place when the positive and negative errors are summed. As illustrated in FIGURE 5, the DC bridge employed in the detection system includes diodes 168 and 170 and resistors 160 and 162 to convert error signals, which may be either positive or negative, to signals of a single polarity. Thus, two series resistors 160 and 162 are connected at their junction 164 to junction 158, which is the reference point for the error voltages generated by each photocell branch 100, 100a, 100b, 100c. For each photocell branch 100 a pair of series connected diodes 168 and 170, 168a and 170a, 168b and 170b, 168c and 170c, are connected across resistors 160 and 162. The junction 166 between the two diodes of each branch is connected to the sliding contact 156 of each photocell branch 100 where the error voltage of the photocell branch 100 appears. The output of the bridge configuration is a single polarity signal which appears at the buses 172 and 174 between diodes 168 and 170 and resistors 160 and 162. If a positive error voltage appears at the sliding contact 156, current will flow through photocell 178, diode 170, resistor 162 and resistor 105, causing bus 172 to be positive with respect to bus 174, since diode 168 blocks current flow from bus 174 to sliding contact 156, and keeps bus 174 at the potential of junction 158, which is less positive than the potential of bus 172. If the error voltage at sliding contact 156 is negative, current will flow through resistor 104, resistor 160, diode 168 and resistor 142. Bus 172 is positive with respect to bus 174, since diode 170 blocks current flow from bus 172 to sliding contact 156, and keeps bus 172 at the positive potential of junction 158, which is greater than the potential of bus 174.

The reflectance validating check circuit operates in a similar manner, with diode 235 operating in the same manner as diode 170, and diode 234 functioning similarly to diode 168. Resistor 214 and resistor 236 function in the bridge circuit as resistors 103 and 104 do. The negative output voltage from bus 174 is applied to the base electrode of emitter follower transistor 176, and, through emitter resistor 198, to a voltage divider consisting of resistors 192 and 194.

The output of the voltage divider is fed into a conventional Schmidt-trigger circuit, comprising transistors 180 and 182, resistors 184, 186, 188 and 190. The output of the Schmidt-trigger circuit is connected to winding 105 of decision relay 107, having accept and reject contacts actuating the control system, which operates to accept or reject the bill under test, and to pay out coins or dispense merchandise if the bill is valid. A thermistor 200, in cooperation with resistors 196 and 198, serves as a temperature compensation network. As the temperature varies, the network compensates for the amount of voltage change that the Schmidt-trigger circuit requires.

Resistor 242 and potentiometer 244 form a series divider across the DC power source 178 for the trigger circuit 106 and is employed as a sensitivity control for the decision circuitry. This establishes a reference voltage which is similar to the leakage voltage which occurs at the emitter of transistor 176. Bus 174 is connected to the sliding tap 246 of potentiometer 244. DC voltage for negative pulse transistor 176 and the Schmidt-trigger circuit 106 is furnished through separate winding 248 of the same transformer 146 used for the photocell bridge DC supply. The AC output of winding 248 is rectified by diode 250 and is filtered by resistor 252 in cooperation with capacitor 254. Voltage regulation is supplied by resistor 256 and Zener diode 258.

It will appear, therefore, that all of the positive and negative error voltages from the shaped area photocell branches, from the reflectance validity branch, and from the color validity branch appear as positive error voltages between buses 172 and 174 and are summed to give a single positive error voltage between these buses. This positive error voltage is fed into the base of transistor 176 where it moves the transistor toward cut-off and increases its impedance. Transistor 176 is connected to DC power supply 178 as an emitter follower. It presents a high input impedance to the validity circuitry, thereby relieving the loading effect of the detection validity circuitry on the trigger circuit. Further, since the output of transistor 176 is tapped at the junction 177 on the voltage divider network in the emitter circuit, connecting the emitter to the positive power supply voltage, any increase in the impedance of transistor 176 results in a negative output signal to be fed to the input circuit 106.

The circuit schematically depicted in FIGURE 6 automatically adjusts the validation system including the shaped areas and the reflectivity check to provide an indication regardless of the age, condition or degree of cleanliness of the bills. If a bill is old and dirty the light transmission through the bill is less than for a crisp, new bill. The light control circuit compensates for age and dirt by adjusting the intensity of the light which is presented to the bill for testing by the shaped area cells and the reflectivity cells. The circuit automatically adjusts the overall light intensity so that the same transillumination is provided for any valid bill regardless of age or condition.

Power for the circuit is provided through transformer 110 which steps line voltage down to a value suitable for transistor operation. Three output levels of DC voltage are provided by two full wave diode rectifiers, including diodes 112, 114, 116 and 118. Point A will be considered the reference voltage level with point B being at a level more negative than A, and point C being more negative then B. Transsitor 120 acts as a series regulator in series with light source 44, which is connected to the DC output of the power source between voltage levels A and B. As the impedance of transistor 120 is increased, the light intensity of light source 44 decreases, and vice versa. Thus, transistor 120 and light source 44 form a voltage divider across voltage levels A and B.

A sensing photocell 122 is placed in series with a variable resistor 124 to form a voltage divider across the full wave power supply output between reference levels A and C. Resistor 124 has a sliding tap 126 which is connected to the base of transistor 130. The output of tap 126 provides a feedback signal and the setting of the tap 126 sets the reference level, in turn setting light source 44 at the proper intensity for a bill of average age and condition. Photocell 122 is located in the detection head and measures the light transmission characteristics of a portion of a bill selected to give an average indication of the age and condition thereof. The photocell measures this by sensing variations of the intensity of the light source 44, which serves as output of the light control circuit. These variations can be caused by either supply voltage fluctuations to a lamp or differences in light transmission caused by bills of different ages and conduitions. For example, since a light area of a bill will tend to darken with age and dirt, this portion of the bill might best be chosen as the test area for photocell 122. In operation, if the bill is old and dirty, less light will be transmitted to sensing cell 122, causing the voltage across it to increase because of an increase in impedance due to the characteristic of the photocell. Voltage at variable tap 126 of series resistor 124 will go more positive toward reference level A. Base electrode 129 of control transistor 130 will then go more positive, moving the transistor toward cut-off and increasing its impedance. Since emitter 128 of transistor 130 is at voltage level A and collector 132 is connected to one end of resistor 134, connected at its other end to voltage level C, the voltage level at the collector electrode 132 will vary as the impedance of transistor 130 varies. As sensing cell 122 receives decreased illumination as from a dirty bill, control transistor 130 goes toward cut-off increasing its impedance. The voltage at collector electrode 132 therefore goes more negative. Base electrode 138 of transistor 120 is connected to collector electrode 132 of transistor 130 and the action of collector electrode 132 causes base electrode of transistor 120 to become more negative, thereby decreasing the impedance of transistor 120. The decreased impedance in the series regulator transistor 120 increases the current to light source 44, thereby increasing light intensity. The increased light intensity increases the illumination of photocell 122, because of the increased light transmission. When the sensing cell 122 receives the proper illumination, its impedance becomes constant and the light intensity remains constant. A new or exceptionally clean bill causes the impedance of sensing cell 122 to decrease, thereby increasing the impedance of the series regulator transistor 120 and decreasing light intensity. The variable tap 126 of resistor 124 is employed to adjust the intensity of lamp 44 to provide proper illumination which will allow the bridge of the detection system to balance for a bill of average condition and cleanliness. Sensing cell 122 and light control circuit automatically compensate to provide proper illumination for new, clean bills and old, dirty bills.

Since color is relatively independent of age or condition, lamp 202, in providing illumination for the color validating circuit, is connected between points A and B and is provided with a conventional voltage stabilizing circuit, including Zener diode 237 and a series resistor 241. It is to be understood that the above-described embodiment is illustrative of an application of the principle of the present invention. Numerous other arrangements within the scope and spirit of the present invention may be devised by those skilled in the art. Accordingly, the present invention is to be defined only within the scope and spirit of the appending claims.

What is claimed is:
1. A bill validation device comprising:
   bill transmission validation means for producing first bi-polar signals representative of the deviation of the light transmission characteristics of selected areas of a bill under test, from reference transmission characteristics;
   color validation means for producing a second bi-polar signal representative of the deviation of the color of a selected spot on said bill from a reference color; and
   means for forming the arithmetic sum of said first and second bi-polar signals to produce a uni-polar decision signals.
2. The device of claim 1 wherein said color validation means includes:
   an illuminating device for illuminating a selected spot on said bill;
   a first light responsive cell sensitive to a first color;
   a second light responsive cell sensitive to a second color;
   mounting means for retaining said first and second color sensitive light responsive cells to receive light reflected from said selected spot on said bill; and
   a comparison circuit responding to said first and second light responsive cells for producing said second bi-polar signal as a function of the difference in the amount of light received by said first and second light responsive cells.
3. The device of claim 2 wherein said comparison circuit comprises a differential amplifier including first and second electronic devices having control electrodes coupled to said first and second color sensitive light responsive cells; and means coupling the output of said differential amplifier to said arithmetic sum forming means.
4. A bill validation device comprising:
   bill transmission validation means for providing first bi-polar signals representative of the deviation of the light transmission characteristics of selected areas of a bill under test, from reference transmission characteristics;
   color validation means for producing a second bi-polar signal representative of the deviation of the color of a selected spot on said bill from a reference color;
   bill reflectance validation means for producing a third bi-polar signal representative of the deviation of the reflectance characteristics of said bill from a reference reflectance characteristic; and
   means for forming the arithmetic sum of said first, second and third bi-polar signals to produce a uni-polar decision signal.
5. The device of claim 4 wherein said bill transmission validation means comprises:
   an illuminating device having a reflector for directing light onto said bill;
   a plurality of apertures overlying selected areas of said bill;
   a plurality of light sensitive cells, one of said light sensitive cells located in each of said apertures and responsive to light from said illuminating device transmitted through said selected areas of the bill and through said apertures; and circuit means for comparing the light transmitted through each of said apertures with a reference level.

6. The device of claim 5 wherein said bill reflectance validation means includes:
a reference light responsive cell energized by light from said reflector;
a validating light responsive cell energized by light reflected from said bill; and
means for providing said third bi-polar signal as a function of the difference between the amount of light received by said validating cell and said reference cell.

7. The device of claim 5 wherein said color validation means includes:
an illuminating device for illuminating a selected spot on said bill;
a first light responsive cell sensitive to a first color;
a second light responsive cell sensitive to a second color;
mounting means for retaining said first and second color sensitive, light responsive cells to receive light reflected from said selected spot on said bill; and
a comparison circuit responding to said first and second cells for producing said second bi-polar signal as a function of the difference in the amount of light received by said first and second light responsive cells.

8. The device of claim 7 wherein said comparison circuit comprises a differential amplifier including first and second electronic devices having control electrodes coupled to said first and second color sensitive light responsive cells; and means connecting the output of said differential amplifier to said arithmetic sum forming means.

9. The device of claim 8 wherein said means for coupling the output of said differential amplifier includes a bridge rectifier coupled between said differential amplifier and said arithmetic sum forming means.

References Cited

UNITED STATES PATENTS

| | | |
|---|---|---|
| 3,020,793 | 2/1962 | Neubrech et al. _____ 250—226 |
| 3,248,549 | 4/1966 | Sanabria _____ 250—226 |
| 3,360,653 | 12/1967 | Phares. |
| 2,941,187 | 6/1960 | Simjian _____ 250—219 |
| 2,950,799 | 8/1960 | Timms _____ 250—219 |
| 3,045,364 | 7/1962 | Surber _____ 35—35 |
| 3,109,100 | 10/1963 | Gecewicz _____ 250—219 |

RALPH G. NILSON, Primary Examiner

MARTIN ABRAMSON, Assistant Examiner

U.S. Cl. X.R.

209—111.7